US006775430B2

(12) United States Patent
Flory et al.

(10) Patent No.: US 6,775,430 B2
(45) Date of Patent: Aug. 10, 2004

(54) PHOTONIC CRYSTAL INTERFEROMETRIC SWITCH

(75) Inventors: Curt A. Flory, Los Altos, CA (US); Mihail M. Sigalas, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 303 days.

(21) Appl. No.: 09/946,847

(22) Filed: Sep. 4, 2001

(65) Prior Publication Data

US 2004/0126055 A1 Jul. 1, 2004

(51) Int. Cl.[7] .................................................. G02B 6/26
(52) U.S. Cl. .......................................... 385/16; 385/27
(58) Field of Search ...................................... 385/16, 27

(56) References Cited

U.S. PATENT DOCUMENTS

| | | | | |
|---|---|---|---|---|
| 6,058,127 A | | 5/2000 | Joannopoulos et al. | ........ 372/92 |
| 6,101,300 A | | 8/2000 | Fan et al. | |
| 6,512,866 B1 | * | 1/2003 | Fan et al. | .................... 385/27 |
| 2001/0012149 A1 | * | 8/2001 | Lin et al. | .................... 359/344 |

FOREIGN PATENT DOCUMENTS

| | | |
|---|---|---|
| WO | WO 98/53350 | 11/1998 |

OTHER PUBLICATIONS

S. Lin, E. Chow, S. Johnson and J. Joannopoulos, "Demonstration of Highly Efficient Waveguiding in a Photonic Crystal Slab at the 1.5 um Wavelength", Optics Letter, vol. 25, No. 17; Sep. 1, 2000; pp. 1297–1299.

S. Johnson, S. Fan, P. Villeneuve, J. Joannopoulos, and L. Kolodziejski, "Guided Modes in Photonic Crystal Slabs", Physical Review, vol. 60, No. 8; Aug. 15, 1999; pp. 5751–5758.

Sigalas, Mihail M., "Microwave Measruements of Stub Tuners in Two–Dimensional Photonic Crystal Waveguides", Physical Review B, col. 65, 125209, pp. 1–5.

Stoffer, R. et al., "Nunerical Studies of 2D Photonic Crystals: Waveguides, Coupling between Waveguides and Filters", Optical and Quantum Electronics 32. 2000, pp. 947–961.

Fan, Shanhui et al., "Channel Drop Tunneling through Localized States", Physical Review Letters, Feb. 2, 1998, pp. 960–963.

Koops, Hans, "Photonic Crystals Built by Three–Dimensional Additive Lithography ENable Integrated Optics of High Density", SPIE, vol. 2849, May 8, 1996, pp. 248–256.

* cited by examiner

*Primary Examiner*—John D. Lee
*Assistant Examiner*—Eric Wong (57) ABSTRACT

A photonic crystal interferometric switch has a photonic crystal; a waveguide in the photonic crystal, the waveguide having at least one input portion, at least two output portions and an interference channel connecting the at least two output portions, the waveguide capable of transmitting light within a bandgap of said photonic crystal; and a resonant member connected to at least one of the at least two output portions to control a property of light in the at least one output portion, to control the interference of light in the waveguide. A 1×2 optical switch may be constructed by tuning the parameters of the resonant member, either optically or electronically, resulting in a switching of a light signal from one output portion to another output portion. Furthermore, by isolating one output portion of the interferometer, the apparatus may be utilized as an optical modulator.

18 Claims, 4 Drawing Sheets

PHOTONIC CRYSTAL INTERFEROMETRIC SWITCH

BACKGROUND OF THE INVENTION

1. Technical Field of the Invention

The present invention relates generally to the field of photonic crystals, and, more particularly, to a photonic crystal interferometer, and to a method for controlling a photonic crystal interferometric switch.

2. Description of Related Art

Photonic crystals (PC) are periodic dielectric structures that can prohibit the propagation of light in certain frequency ranges. More particularly, photonic crystals are fabricated to have spatially periodic variations in refractive index; and for a sufficiently high refractive index contrast, photonic bandgaps can be opened in the structure's optical spectrum. These bandgaps comprise frequency ranges within which the propagation of light through the photonic crystal is prevented (the term "light" as used herein is intended to include radiation throughout the electromagnetic spectrum, and is not limited to visible light).

It is known that introducing defects in the periodic structure of the photonic crystal allows the existence of localized electromagnetic states that are trapped at the defect site, and that have resonant frequencies within the bandgap of the surrounding photonic crystal material. By providing a region of such defects extending through the photonic crystal, a waveguiding structure is created which can be used in the control and guiding of light.

A photonic crystal that has spatial periodicity in three dimensions can prevent the propagation of light within the crystal's bandgap in all directions; however, the fabrication of such a structure is technically challenging. A more attractive alternative is to utilize a 2-dimensional photonic crystal slab that has a two-dimensional periodic lattice incorporated within it. In a structure of this sort, light propagating in the slab is confined in the direction perpendicular a major surface of the slab via total internal reflection, and light propagating in the slab in directions other than perpendicular to a major surface is controlled by the properties of the photonic crystal slab. A two-dimensional photonic crystal slab has the advantage that it is compatible with the planar technologies of standard semiconductor processing; and, in addition, the planar structure of the slab makes an optical signal in a waveguide created in the slab more easily accessible to interaction. This provides the additional advantage that the structure is susceptible to being used to create active devices.

Both theoretical and experimental work have demonstrated the efficient guidance of light in a two-dimensional photonic crystal slab waveguide device (see "Demonstration of Highly Efficient Waveguiding in a Photonic Crystal Slab at the 1.5 $\mu$m Wavelength", S. Lin, E. Chow, S. Johnson and J. Joannopoulos, Opt. Lett. 25, pp. 1297–1299, 2000). Furthermore, experimental work is demonstrating the capability of fabricating such devices that are able to propagate light with a high degree of efficiency. As a result, there has already been some investigation into potential applications for interacting with the guided optical modes of the waveguide device. Such applications, which have been previously discussed include static (fixed wavelength) or tunable channel drop filters, and tunable resonant microcavity defects (see U.S. Pat. No. 6,058,127).

Commonly assigned, copending U.S. patent application Ser. No. 09/846,856, the disclosure of which is incorporated by reference herein, describes a photonic crystal waveguide apparatus which includes a transverse resonant stub tuner. This apparatus has transmission zeros at specified frequencies determined by the resonant frequencies of the transverse stub tuner (the term "transmission zero" refers to a frequency range within the bandgap of the photonic crystal at which light that is otherwise capable of being transmitted by the waveguide is prevented from being transmitted). The application also discloses techniques for tuning electromagnetic properties of the transverse resonant stub tuner to shift the transmission zeros in the frequency domain of the waveguide apparatus. These techniques permit the apparatus to be utilized in applications such as a 1×1 optical switch and an optical modulator, relying on the ability of the transverse resonant stub tuner to modify the magnitude of the optical power in the waveguide apparatus.

SUMMARY OF THE INVENTION

The present invention provides a photonic crystal interferometer apparatus for controlling the interference of light in a waveguide of the apparatus.

An exemplary photonic crystal interferometer apparatus according to an embodiment of the present invention may comprise a photonic crystal with a waveguide in the photonic crystal. The waveguide may comprise at least one input portion, at least two output portions and an interference channel connecting the at least two output portions. The waveguide is capable of transmitting light within a bandgap of the photonic crystal. There is a resonant member connected to at least one of the at least two output portions to control a property of light in the waveguide to control interference of light in the waveguide.

According to a another embodiment of the invention, the resonant member comprises a resonator region and a connecting channel connecting the resonator region and at least one of the at least two output portions. By setting the resonant frequency of the resonator region, the resonator region and the connecting channel cooperate with the interference channel to cause light in one of the at least two output portions of the waveguide to constructively interfere and light in another of the at least two output portions to destructively interfere with light in the interference channel.

According to a second embodiment of the invention, the waveguide comprises a region of first defects in a periodic lattice of the photonic crystal which extends through the photonic crystal, and the connecting channel comprises at least one second defect in the periodic lattice. The resonator region comprises a region in the photonic crystal in which the periodic lattice is modified in an appropriate manner to define the resonator region.

According to a third embodiment of the invention, the at least one input portion of the waveguide comprises one input portion and the at least two output portions comprise two output portions. The periodic lattice of the photonic crystal comprises an array of dielectric posts, and the waveguide is created by omitting portions of lines of the posts. Specifically, the input portion is created by omitting a portion of a line of posts, and the two output portions are each created by omitting portions of two lines of posts that are perpendicular to each other, and which are connected to the input portion. The interference channel is created by omitting a portion of a line of posts that connects the two output portions. The connecting channel is created by omitting one additional post in the periodic lattice to define a short channel that is connected to one of the two output portions and extends perpendicularly from a sidewall of the one output portion. The resonator region comprises a generally square region having a sub-array of posts that are larger in diameter than the other posts in the periodic lattice.

By controlling parameters of the resonator region, such as the number of posts in the region and the size of the posts; the resonant frequency of the resonant member, and, hence, the phase of the light in one of the two output portions of the waveguide can be effectively controlled. By controlling the phase of the light in the one of the two output portions, light interference is created in the two output portions. The interference can be constructive interference in one of the two output portions, and destructive interference in the other of the two output portions, thus providing a photonic crystal interferometer.

According to a fourth embodiment of the invention, the photonic crystal interferometer apparatus comprises a photonic crystal interferometric switch. In particular, constructive interference in an output portion allows the light to propagate through the portion, while destructive interference in an output portion prevents the light from propagating though the portion. The present invention utilizes this feature by providing a tuning member connected to the resonator region of the resonant member for tuning the resonant frequency of the resonator region. The tuning member preferably comprises a dielectric constant tuning member that controls the dielectric constant of the dielectric posts in the resonator region; which, in turn, controls the resonant frequency of the resonator region. By operation of the tuning member, the constructive and destructive interference in the two output portions can be reversed, thus creating an optical switch.

The dielectric constant tuning member can be an electronic dielectric constant tuning member for tuning the dielectric constant using, for example, the charge carrier effect or the electro-optic effect. Alternatively, the tuning member can be an optical dielectric constant tuning member for tuning the dielectric constant using, for example, the photorefractive effect.

According to further embodiments of the invention, the photonic crystal interferometric switch can, for example, be operated as an n×m switch, where n is the number of input portions, and m is the number of output portions. Furthermore, the photonic crystal interferometric switch can be operated as a modulator.

In general, the photonic crystal interferometric switch of the present invention can be utilized in numerous applications and provides a designer with the capability of designing complex routing architectures in an optical integrated circuit.

Yet further advantages and specific features of the invention will become apparent hereinafter in conjunction with the following detailed description of exemplary embodiments of the invention.

DETAILED DESCRIPTION OF THE EXEMPLARY EMBODIMENTS OF THE INVENTION

Figure 1:
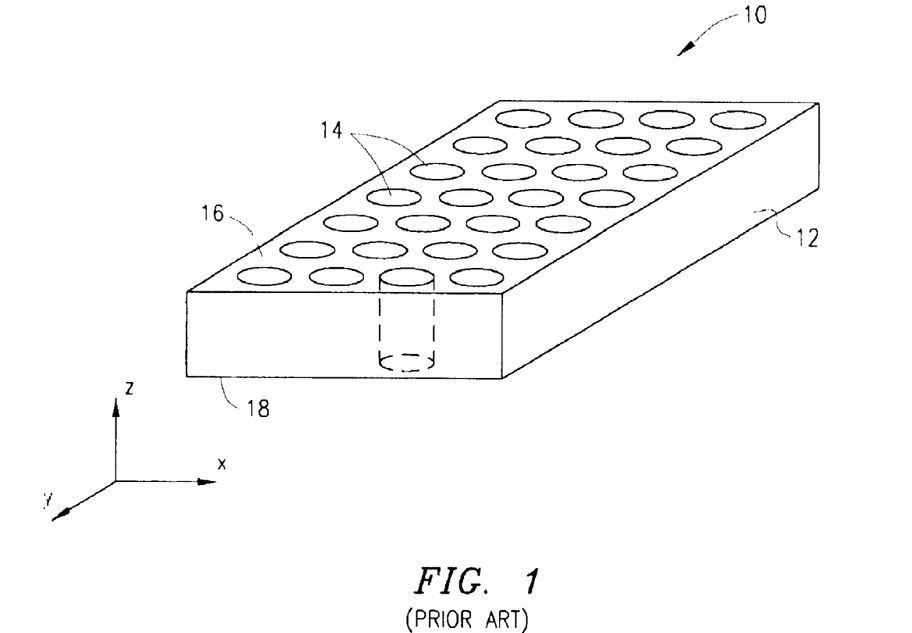
FIG. 1 is a schematic, perspective view of a two-dimensional photonic crystal slab as is known in the prior art.

FIG. 1 illustrates a two-dimensional photonic crystal slab that is known in the prior art, and is provided to assist in explaining the present invention. The photonic crystal slab is generally designated by reference number 10, and comprises a slab body 12 having an array of posts 14 therein. As shown in FIG. 1, posts 14 are oriented parallel to one another and extend through the slab body from top face 16 to bottom face 18 thereof.

The two-dimensional photonic crystal slab 10 can take various forms. For example, the posts 14 can comprise rods formed of a first dielectric material, and the slab body 12 can comprise a body formed of a second dielectric material that differs in dielectric constant from the dielectric constant of the first dielectric material. Alternatively, the posts can comprise holes formed in a slab body of dielectric material; or the posts can comprise rods of dielectric material and the slab body can be air, another gas or a vacuum. In addition, the posts can be arranged to define a square array of posts; or they can be arranged in a different manner, such as in a rectangular array or a triangular array.

In a two-dimensional photonic crystal slab such as illustrated in FIG. 1, light propagating in the slab is confined in the direction perpendicular to the slab faces 16 and 18 via total internal reflection. Light propagating in the slab in directions other than perpendicular to the slab faces, however, is controlled by the spatially periodic structure of the slab. In particular, the spatially periodic structure causes a photonic bandgap to be opened in the transmission characteristics of the structure within which the propagation of light through the slab is prevented. Specifically, light propagating in the two-dimensional photonic crystal slab of FIG. 1 in directions other than perpendicular to a slab face and having a frequency within a bandgap of the slab will not propagate through the slab; while light having frequencies outside the bandgap is transmitted through the slab unhindered.

Commonly assigned, copending U.S. patent application Ser. No. 09/846,748, the disclosure of which is incorporated by reference herein, describes how the introduction of defects in the periodic lattice of a photonic crystal allow the existence of localized electromagnetic states which are trapped at the defect site, and which have resonant frequencies within the bandgap of the surrounding photonic crystal material. By arranging these defects in an appropriate manner, a waveguide can be created in the photonic crystal through which light having frequencies within the bandgap of the photonic crystal (and that thus would normally be prevented from propagating through the photonic crystal) is transmitted through the photonic crystal. The region of defects can extend in a straight line, or the region can be arranged to include one or more bends, for example, 90 degree bends, to define a bent waveguide. The effective propagation of light in a two-dimensional photonic crystal waveguide apparatus has previously been demonstrated using two-dimensional Finite Difference Time-Domain (FDTD) techniques (see "Computational Electrodynamics, the Finite-Difference Time-Domain Method", A. Taflove, Artech House, 1995), and it has been shown that light can be efficiently guided with low loss though both a straight waveguide and a waveguide with one or more 90 degree bends.

Figure 2:
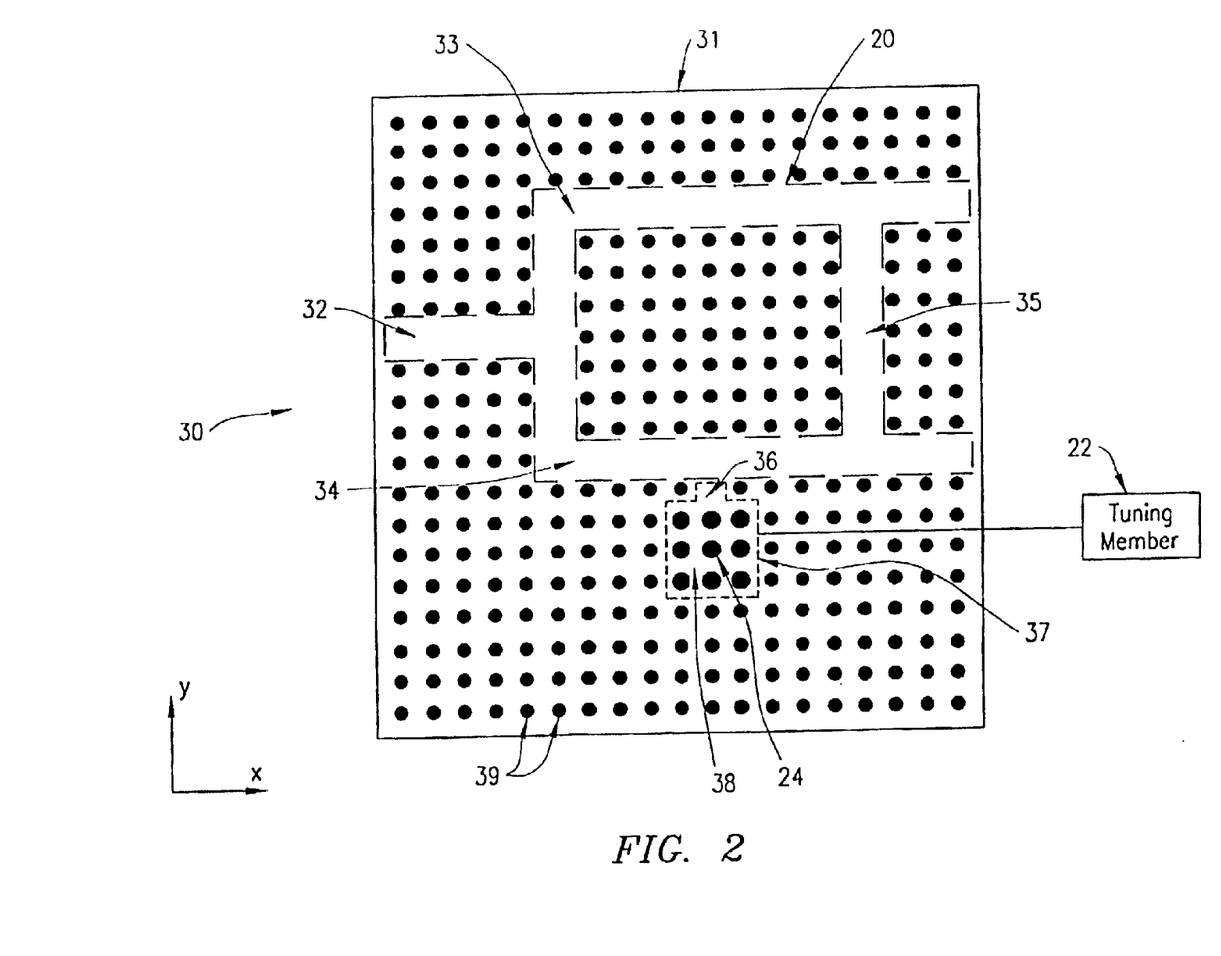
FIG. 2 is a schematic, cross-sectional view of a two-dimensional photonic crystal interferometric switch according to an embodiment of the present invention.

FIG. 2 illustrates a photonic crystal interferometric switch according to an embodiment of the invention. The switch is generally designated by reference number 30, and comprises a two-dimensional photonic crystal slab 31 comprised of a square array of dielectric posts 39 in air. A region of defects in the photonic crystal slab creates a waveguide 20 through which light having a frequency within the bandgap of the surrounding photonic crystal material can propagate. Waveguide 20 comprises an input portion 32, output portions 33 and 34, and an interference channel 35 connecting the output portions 33 and 34. The input portion 32 is created by omitting posts from a portion of one line of posts, and the output portions 33 and 34 are each created by removing posts from portions of two lines of posts that are perpendicular to each other so as to create two 90 degree bends in the output portions. The interference channel 35 is created by omitting posts from a portion of a line of posts that is perpendicular to the output portions 33 and 34.

In addition, the photonic crystal slab 30 includes a resonant member 37 which extends from a sidewall of output portion 34 of the waveguide to control the phase of the light in output portion 34 of the waveguide. The resonant member 37 comprises a resonator region 38 and a connecting channel 36.

In the embodiment illustrated in FIG. 2, connecting channel 36 comprises a short channel that extends from a sidewall of output portion 34 of waveguide 20 in a direction perpendicular to the output portion, and is created by omitting one post 39 from the array of posts. The resonant region 38 comprises a generally square region having a 3×3 sub-array of posts 24 which are larger in diameter than posts 39. As shown in FIG. 2, the connecting channel 36 comprises a short waveguide section which connects the resonator region 38 and the output portion 34.

As also shown in FIG. 2, a tuning member 22 is provided to control the dielectric constant of the posts 24 in the resonator region 38 to, in turn, control the resonant frequency of resonant member 37, and thus the phase of the light in the output portion 34. As will be explained more fully hereinafter, by controlling the phase of the light in output portion 34, the interference in each of the output portions can be switched from constructive to destructive interference or from destructive to constructive interference to thereby provide an optical switch.

Dielectric constant tuning members are well-known to those skilled in the art and need not be described in any detail herein, and can be either electronic or optical. For example, an electronic dielectric constant tuning member may utilize the charge carrier effect or the electro-optic effect. An optical dielectric constant tuning member may utilize the photorefractive effect. Although all of these effects are relatively small in the optical frequency regime, they are large enough to effect appropriate tuning of the apparatus of the present invention.

Figure 3:
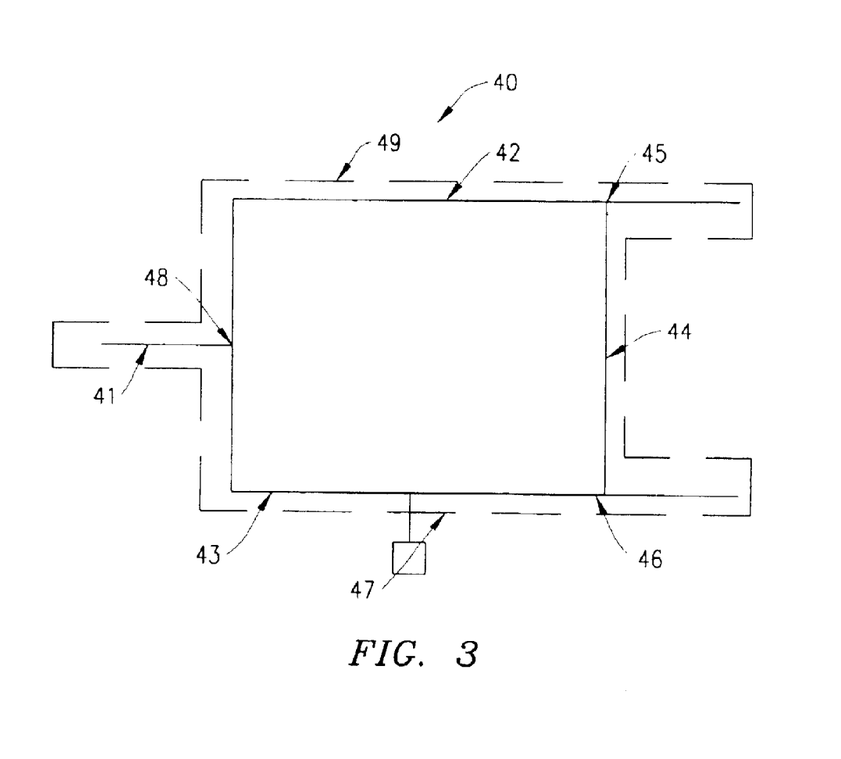
FIG. 3 is a schematic of a one-dimensional model of the photonic crystal two interferometric switch of FIG. 2.

The operation of the photonic crystal interferometric switch 30 in FIG. 2 is best described by a simplified one-dimensional model which exhibits the essence of the interference phenomena in the interferometric switch. FIG. 3 is a diagram of the simplified one dimensional model of the switch, designated generally as reference number 40. In this model of the photonic crystal interferometric switch, waveguide 20 of FIG. 2 is replaced by an idealized one-dimensional waveguide 49 that comprises one input portion 41, two output portions 42 and 43, and an interference channel 44 connecting the two output portions 42 and 43. A light signal propagates through input portion 41 to location 48, and splits into two light signals of equal amplitude propagating along output portions 42 and 43. The amplitude of the light signal in input portion 41 will have the approximate form:

$$E \sim \exp(jkx)$$

where $$k = 2\frac{\pi}{\lambda},$$

$\lambda$ is the wavelength of the light signal, j is a complex number and x is the distance along input portion 41. After traveling though output portions 42, and 43, each of which include a 90 degree bend, the two light signals will interfere at locations 45 and 46, and have the form:

$$E_{45} \sim \exp(jkL_1) + \exp(jk[L_1+L_2]+j\phi)$$

$$E_{46} \sim \exp(jkL_1+j\phi) + \exp(jk[L_1+L_2])$$

where $E_{45}$ is the amplitude of the light signal at location 45, $E_{46}$ is the amplitude of the light signal at location 46, $L_1$ is the length of output portions 42 and 43, $L_2$ is the length of interference channel 44, and $\phi$ is the added phase-shift from a tuning system 47. These expressions can be rewritten as:

$$E_{45} \sim \exp(jkL_1)[1+\exp(jkL_2+j\phi)]$$

$$E_{46} \sim \exp(jk[L_1+L_2])[1+\exp(-jkL_2+j\phi)],$$

from which the magnitudes of the energy densities in the two output portions 42 and 43 can be computed:

$$|E_{45}|^2 \sim \cos^2\left(\frac{kL_2+\phi}{2}\right)$$

$$|E_{46}|^2 \sim \cos^2\left(\frac{kL_2-\phi}{2}\right)$$

where $|E_{45}|^2$ is the magnitude of the energy density at location 45, and $|E_{46}|^2$ is the magnitude of the energy density at location 46.

Figure 4:
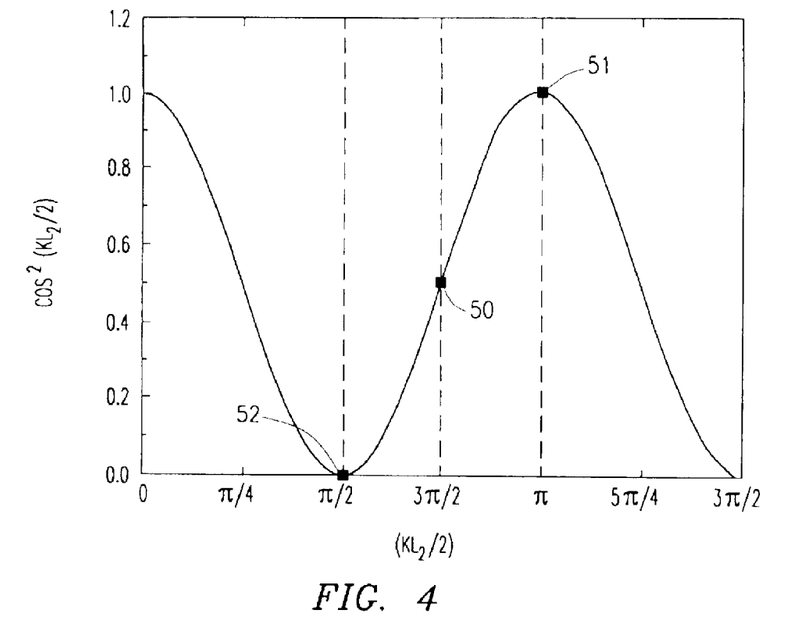
FIG. 4 is a graph that illustrates the magnitude of the energy densities in the output portions of the waveguide of the one-dimensional photonic crystal interferometric switch of FIG. 3.

FIG. 4 is a plot of cos $$\left(\frac{kL_2}{2}\right),$$

that approximates the energy density of the light signals at locations 45 and 46 as given above versus $$\frac{kL_2}{2},$$

which is the phase-shift of the light signals propagating through the interference channel. If the length of interference channel 44 is chosen such that $$\frac{kL_2}{2} = 3\pi/4,$$

with no phase-shift, φ, from tuning system 47 (tuning system 47 corresponds to the resonant member 37 and the tuning member 22 in FIG. 2); then the amplitude of the light signals at locations 45 and 46 will correspond to point 50 in FIG. 4, and have half the maximum output value, thus creating a power splitter. The light signal power at locations 45 and 46 can be increased or decreased by adding phase-shift to the light signal in output portion 43 using tuning system 47. The additional phase-shift in the frequency domain correlates into a time delay, which brings the two signals out of phase, creating interference. An optical switch is created when tuning system 47 is used to change the phase of the signal in output portion 43. It is known in the prior art that the phase-shift of a signal propagating through a waveguide and past a resonant region is zero for frequencies far from resonance, and non-zero for frequencies near resonance. The phase-shift is $$-\frac{\pi}{2}$$

if the signal frequency must be increased to match the resonant frequency of tuning system 47, and $$+\frac{\pi}{2}$$

if the signal frequency must be decreased to match the resonant frequency of tuning member 47.

Referring to FIG. 3, if tuning system 47 has a resonant frequency slightly above point 50 in FIG. 4, the light signal in output portion 43 will experience a $$-\frac{\pi}{2}$$

phase-shift, the power level of the light signal in output portion 43 will shift from location 50 in FIG. 4, to location 51, or to maximum output power. Similarly, the light signal propagating through output portion 42 at location 45 will experience destructive interference, corresponding to no light signal output, or location 52 in FIG. 4. Thus, by changing the resonant frequency of tuning system 47, the light signal can be switched to location 46.

Figure 5:
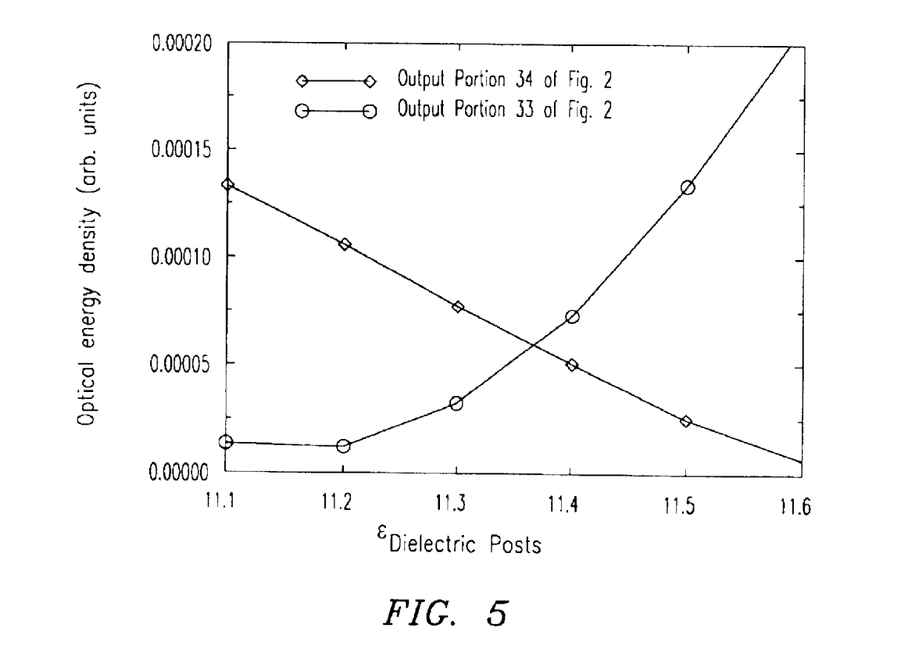
FIG. 5 is a graph that illustrates the results of changing the dielectric constant of posts in the resonator region of the two-dimensional photonic crystal interferometric switch of FIG. 2. Plotted are the energy densities in the two output portions of the waveguide as a function of the relative dielectric constant in the resonator region.

FIG. 5 is a plot of the energy densities in the output portions 33, and 34 of the photonic crystal interferometric switch of FIG. 2. The energy densities were calculated using the above-mentioned two-dimensional Finite Difference Time-Domain (FDTD) technique. For the calculations, photonic crystal substrate 31 consisted of a square array of dielectric posts 39 each of radius equal to 0.18 $a_0$, where $a_0$ is the interpost spacing of the array. Output portions 33, and 34 were each formed by omitting dielectric posts 39 from portions of two lines of posts perpendicular to each other. Input portion 32 was formed by omitting dielectric posts from a portion of a line of dielectric posts. The resonant member 37 comprised a short (one post) connecting channel 36 perpendicular to output portion 34, and the resonator region 38 comprised a 3×3 square array of posts of diameter 0.25 a0. The dielectric constant of the posts 24 was set equal to 11.4, and is tunable by a few percent of the nominal value. As the nominal value of the dielectric constant is varied, using tuning member 22, and the resonant frequency of resonant member 37 is swept though the frequency of the light in output portion 34, the light in input portion 32 is switched between the two output portions 33 and 34 due to the change in interference at the desired output portion, created by the phase change created by tuning member 22, thus creating an optical switch.

The simulated performance described above is intended to be exemplary only, as operational characteristics of the apparatus of the present invention can be modified in many ways. For example, by decreasing the dimensions of the resonant member, it is possible to have the switching occur for a smaller range of dielectric constant variation.

It should also be recognized that the simulation described above was done in two-dimensions, ignoring the effects of the dimension parallel to the constituent dielectric posts. It is known in the art that the generalization of structures of this sort to three-dimensions results in some quantitative differences in the computed results; however, the qualitative operative physical characteristics are maintained.

Figure 6A:
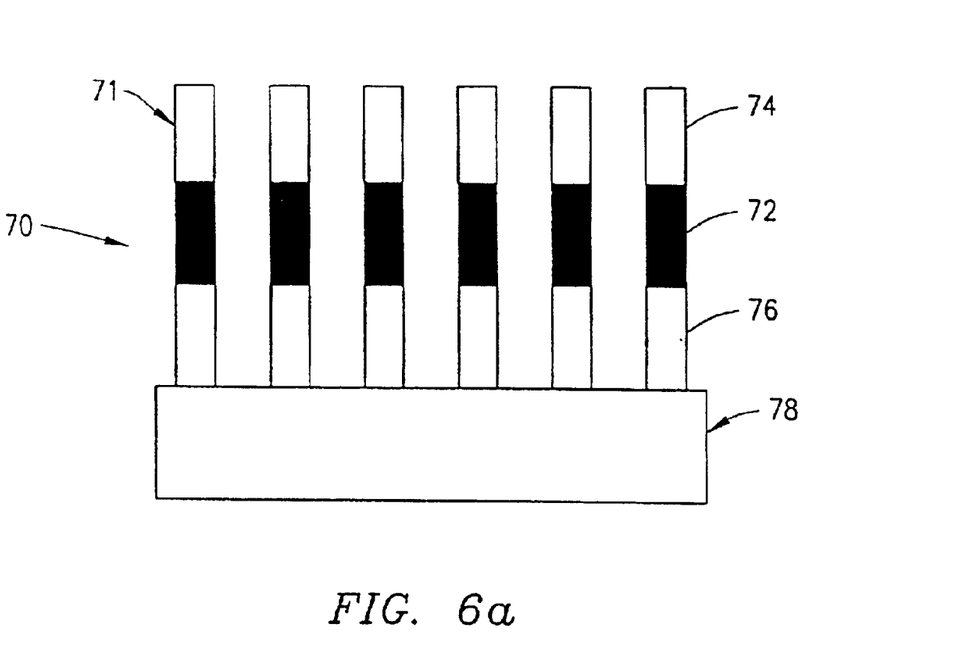
FIGS. 6a and 6b schematically illustrate two exemplary geometries of explicit three-dimensional realizations of the photonic crystal "dielectric slabs of posts" which may be used in three-dimensional implementations of the present invention.
Figure 6B:
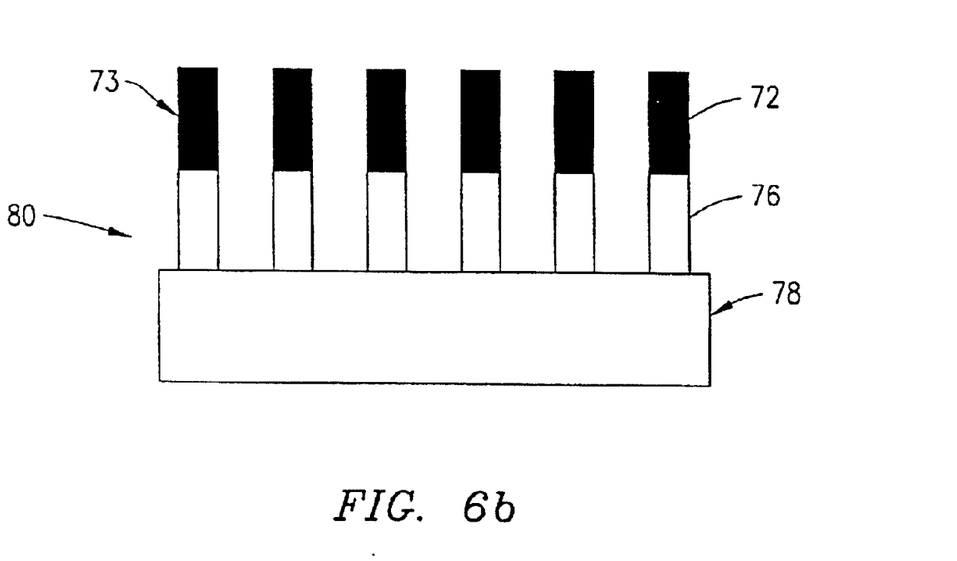

The photonic crystal lattice structure incorporated in the previously described two-dimensional structures can take a number of three-dimensional realizations. Two exemplary three-dimensional geometries are shown in FIGS. 6a and 6b, making explicit the finite length of the dielectric posts. In the structure 70 illustrated in FIG. 6a, post units 71 comprise photonic crystal post portions 72 sandwiched between upper and lower cladding layer post portions 74 and 76, with each post unit being supported on a substrate 78. In the structure 80 shown in FIG. 6b, post units 73 lack the upper cladding post portions 74.

As described previously, optical confinement in the dimension parallel to the posts is effected by the larger dielectric constant of the photonic crystal region, leading to total internal reflection of the light in this dimension. It should also be noted that another realization could be to have the posts of the photonic crystal "sandwiched" between two reflective surfaces, either dielectric or metallic, to provide the confinement necessary in the dimension parallel to the posts.

It should also be understood that although the photonic crystal interferometric switch described above generally comprise arrays of dielectric rods in air; the photonic crystals can also be composed of an array of gas or vacuum "filled" holes in a dielectric substrate, or an array of dielectric rods embedded in a body of a dielectric material having a different dielectric constant than that of the material of the rods. In addition, although the above embodiments generally describe two-dimensional apparatus; the invention can also be applied to fully three-dimensional photonic crystal apparatus with the same sort of operational characteristics.

The photonic crystal interferometric switch of the present invention can be implemented as a 1×2 switch, where the action of the resonant member is as a tunable delay mechanism, causing the two counterpropagating signals in the interferometer to selectively constructively or destructively interfere at the output portions of the switch. The switch can also be employed as a modulator, by isolating one output portion, and in general, can be used in any application where a signal router can be useful.

While what has been described constitutes presently preferred embodiments of the invention, it should be recognized that the invention can take many other forms. For example, although the embodiments described herein include a single waveguide, with one input portion and two output portions, in other embodiments the waveguide may comprise two or more input portions and four or more output portions. Further, several waveguides may be incorporated into an optical integrated circuit comprising a complex routing architecture using the photonic crystal integrated circuit. Also, although the regions of defects in the described embodiments were created by omitting selected posts, in other embodiments, the regions of defects can be created by modifying selected posts.

Because the invention can take numerous forms, it should be understood that the invention should be limited only insofar as is required by the scope of the following claims.

We claim:

1. A photonic crystal interferometer apparatus comprising:
   a photonic crystal;
   a waveguide in said photonic crystal, said waveguide comprising at least one input portion, at least two output portions and an interference channel capable of transmitting light and connecting said at least two output portions, said waveguide capable of transmitting light within a bandgap of said photonic crystal;
   a resonant member connected to at least one of said at least two output portions; and
   a tuning member connected to said resonant member for controlling a resonant frequency of said resonant member to control a property of light in said at least one of said at least two output portions to control interference of light in said waveguide.

2. The photonic crystal interferometer apparatus according to claim 1, wherein said resonant member comprises a resonator region and a connecting channel connecting said resonator region and said at least one of said at least two output portions.

3. The photonic crystal interferometer apparatus according to claim 2, wherein the said connecting channel extends perpendicular from a sidewall of said at least one of said at least two output portions.

4. The photonic crystal interferometer apparatus according to claim 2, wherein said photonic crystal comprises a periodic lattice, and wherein said waveguide comprises a region of first defects in said periodic lattice, said connecting channel comprises at least one second defect in said periodic lattice, and said resonator region comprises a modified portion of said periodic lattice.

5. The photonic crystal interferometer apparatus according to claim 4, wherein said periodic lattice comprises an array of posts, and wherein said region of first defects is created by omitting posts in portions of lines of said array of posts, said at least one second defect is created by omitting one post in said array of posts and wherein said resonator region comprises a sub-array of said array of posts, said sub-array comprising posts having a diameter different from other posts in said array of posts.

6. The photonic crystal interferometer apparatus according to claim 5, wherein said property of light comprises the phase of the light, and wherein design parameters of said resonator region control the phase of the light in said at least one of said at least two output portions, said design parameters of said resonator region comprising at least one of the number of posts in said resonator region and the diameter of said posts in said resonator region.

7. The photonic crystal interferometer apparatus according to claim 1, wherein said resonant member includes a resonator region, said resonator region comprising an array of dielectric posts, and wherein said tuning member comprises a dielectric constant tuner for tuning a dielectric constant of a material comprising said dielectric posts in said resonator region.

8. The photonic crystal interferometer apparatus according to claim 7, wherein said dielectric constant tuner comprises a dielectric constant tuner selected from the group consisting of an electronic dielectric constant tuner and an optical dielectric constant tuner.

9. The photonic crystal interferometer apparatus according to claim 1, wherein said photonic crystal interferometer apparatus comprises an interferometric switch.

10. The photonic crystal interferometer apparatus according to claim 9, wherein said interferometric switch comprises a switch selected from the group consisting of a 1×2 optical switch and an optical modulator.

11. The photonic crystal interferometer apparatus according to claim 1, wherein said photonic crystal comprises a two-dimensional photonic crystal slab.

12. A photonic crystal interferometric switch comprising:
    a photonic crystal;
    a waveguide in said photonic crystal, said waveguide comprising at least one input portion, at least two output portions and an interference channel capable of transmitting light and connecting the at least two output portions, said waveguide capable of transmitting light having a frequency within a bandgap of the photonic crystal; and
    a tuning system extending from a sidewall of at least one of said at least two output portions of said waveguide to control the phase of light in said at least one of said at least two output portions to control the routing of light in the said waveguide, said tuning system comprising a resonant member, said resonant member comprising a resonator region and a connecting channel connecting said resonator region and said at least one of said at least two output portions, and a tuning member, said tuning member connected to said resonator region to control a resonant frequency of said resonant member.

13. The photonic crystal interferometric switch according to claim 12, wherein said resonator region comprises an array of dielectric members, and said tuning member comprises a dielectric constant tuner for controlling the dielectric constant of said dielectric members.

14. The photonic crystal interferometric switch according to claim 12, wherein said photonic crystal interferometric switch comprises a switch selected from the group consisting of an optical modulator and an optical 1×2 interferometric switch.

15. In an optical switch which comprises a photonic crystal, a waveguide in said crystal, said waveguide comprising an input portion, two output portions and an interference channel capable of transmitting light and connecting the two output portions, a resonant member connected to one of said two output portions to control the phase of light in the one of said two output portions to create constructive interference in one of said two output portions such that light will propagate through said one of said two output portions, and destructive interference in the other of said two output portions, such that light will be prohibited from propagating through said other of said two output portions, and a tuning member connected to said resonant member for controlling a resonant frequency of said resonant member, a method for operating said switch comprising operating said tuning member for changing the resonant frequency of said resonant member to change the phase of light in the one of said two output portions to switch the propagation of light from one of said two output portions to the other of said two output portions.

16. The method according to claim 15, wherein said resonant member comprises a resonator region having an array of dielectric members and a connecting channel connecting said resonator region and said one of said two output portions, and wherein said operating said tuning member for changing the resonant frequency of said resonant member comprises operating said tuning member for changing a dielectric constant of the dielectric members in said resonator region.

17. The method according to claim 16, wherein said changing a dielectric constant of said dielectric members comprises optically changing said dielectric constant of said dielectric members.

18. The method according to claim 16, wherein said changing a dielectric constant of said dielectric members comprises electronically changing said dielectric constant of said dielectric members.

* * * * *